(12) United States Patent
Hood

(10) Patent No.: US 7,349,874 B1
(45) Date of Patent: Mar. 25, 2008

(54) OTHER REVENUE IMPLEMENTATION FOR FINANCIAL PROCESSING IN A RELATIONAL DATABASE MANAGEMENT SYSTEM

(75) Inventor: George Robert Hood, Poway, CA (US)

(73) Assignee: MCR Corp., Dayton, OH (US)

( * ) Notice: Subject to any disclaimer, the term of this patent is extended or adjusted under 35 U.S.C. 154(b) by 1617 days.

(21) Appl. No.: 09/608,681

(22) Filed: Jun. 29, 2000

(51) Int. Cl.
*G06Q 40/00* (2006.01)

(52) U.S. Cl. ....................................................... 705/35
(58) Field of Classification Search ................. 705/30, 705/36, 35, 8, 38
See application file for complete search history.

(56) References Cited

U.S. PATENT DOCUMENTS

| | | | | |
|---|---|---|---|---|
| 5,189,608 | A * | 2/1993 | Lyons et al. ................... | 705/30 |
| 5,237,498 | A * | 8/1993 | Tenma et al. ................. | 705/30 |
| 5,249,120 | A * | 9/1993 | Foley .......................... | 364/401 |
| 5,615,109 | A * | 3/1997 | Eder ............................. | 705/8 |
| 5,655,085 | A * | 8/1997 | Ryan et al. .................... | 705/4 |
| 5,712,987 | A | 1/1998 | Waits et al. | |
| 5,721,831 | A | 2/1998 | Waits et al. | |
| 5,819,237 | A * | 10/1998 | Garman ........................ | 705/36 |
| 5,911,135 | A * | 6/1999 | Atkins .......................... | 705/36 |
| 5,991,743 | A * | 11/1999 | Irving et al. ................... | 705/36 |
| 6,026,382 | A | 2/2000 | Kalthoff | |
| 6,085,175 | A * | 7/2000 | Gugel et al. ................... | 705/36 |
| 6,112,190 | A * | 8/2000 | Fletcher et al. ............... | 705/38 |
| 6,233,566 | B1 * | 5/2001 | Levine et al. .................. | 705/37 |
| 6,240,399 | B1 * | 5/2001 | Frank et al. ................... | 705/36 |
| 6,249,770 | B1 * | 6/2001 | Erwin et al. ................... | 705/10 |
| 6,253,192 | B1 * | 6/2001 | Corlett et al. ................. | 705/36 |
| 6,275,813 | B1 * | 8/2001 | Berka .......................... | 705/30 |
| 6,292,787 | B1 * | 9/2001 | Scott et al. ................... | 705/36 |
| 6,343,272 | B1 * | 1/2002 | Payne et al. ................... | 705/4 |
| 6,360,210 | B1 * | 3/2002 | Wallman ...................... | 705/36 |

(Continued)

FOREIGN PATENT DOCUMENTS

WO  WO 00/62224  10/2000

OTHER PUBLICATIONS

Kassing, Jay, "Profitability: Growing the bottom line", CSI, 1999, 43 pages.*

(Continued)

*Primary Examiner*—Andrew Joseph Rudy
(74) *Attorney, Agent, or Firm*—Gates & Cooper

(57) ABSTRACT

A financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed using the account, event and organization attributes accessed from the relational database management system, as well as one or more profit factors and one or more rules. The profitability calculations include the following:

| | |
|---|---|
| Profit | = Net Interest Revenue (NIR) |
| | + Other Revenue (OR) |
| | − Direct Expense (DE) |
| | − Indirect Expense (IE) |
| | − Risk Provision (RP) |

In this calculation, Other Revenue (OR) comprises: (1) revenue that can be associated with an account, (2) revenue that can be associated with a person, and (3) revenue that is not specifically associated with an account or person.

27 Claims, 3 Drawing Sheets

U.S. PATENT DOCUMENTS

| | | | |
|---|---|---|---|
| 6,393,406 B1* | 5/2002 | Eder | 705/7 |
| 6,477,510 B1* | 11/2002 | Johnson | 705/30 |
| 6,571,219 B1* | 5/2003 | Spivey | 705/36 |
| 2002/0026394 A1* | 2/2002 | Savage et al. | 705/34 |

OTHER PUBLICATIONS

"Canadian Bank Mines for Data-based gold", Action Items, Dec. 2, 1997, 2 pages.*

"Bank of Ireland Selects Compaq AlphaServers to Help Improve Profitability Management", Dec. 3, 1998, Compaq, 2 pages.*

"Marquis tops 300 MCIF-CRM Data Mart Clients Worldwide", Apr. 18, 2000, 2 pages.*

Middleton, Arthur, "How Profitability Analysis in used in Financial Services Marketing", date unknown, 3 pages.*

Curley, Bob, "Royal Bank unearths profitability solution," Bank Systems & Technology, Apr. 2000, 2 pages.*

Price et al., "College Accounting", Glencoe Macmillan/McGraw-Hill, Seventh Edition, 1994, pp. 28-41, 529-531, 966-982.*

Ainsworth et al., "Introduction to Accounting: An Integrated Approach", Preliminary Edition, 1996, vol. 2, chapter 22.*

John R. Johnson, Raising Relationships, Bank Marketing, Jun. 1999, pp. 16-24.*

John R. Johnson, Raising Relationships, Bank Marketing, Jun. 1999, pp. 30-36, footnote 1.*

* cited by examiner

OTHER REVENUE IMPLEMENTATION FOR FINANCIAL PROCESSING IN A RELATIONAL DATABASE MANAGEMENT SYSTEM

CROSS REFERENCE TO RELATED APPLICATIONS

This application is related to the following co-pending and commonly assigned patent applications:

application Ser. No. 09/610,646, entitled "BASIC AND INTERMEDIATE NET INTEREST REVENUE IMPLEMENTATION FOR FINANCIAL PROCESSING IN A RELATIONAL DATABASE MANAGEMENT SYSTEM," filed on same date herewith, by George Robert Hood and Paul Phibbs;

application Ser. No. 09/608,355, entitled "ADVANCED AND BREAKTHROUGH NET INTEREST REVENUE IMPLEMENTATION FOR FINANCIAL PROCESSING IN A RELATIONAL DATABASE MANAGEMENT SYSTEM," filed on same date herewith, by George Robert Hood and Paul Phibbs;

application Ser. No. 09/608,675, entitled "DIRECT EXPENSE IMPLEMENTATION FOR FINANCIAL PROCESSING IN A RELATIONAL DATABASE MANAGEMENT SYSTEM," filed on same date herewith, by George Robert Hood;

application Ser. No. 09/608,342, entitled "INDIRECT EXPENSE IMPLEMENTATION FOR FINANCIAL PROCESSING IN A RELATIONAL DATABASE MANAGEMENT SYSTEM," filed on same date herewith, by George Robert Hood; and application Ser. No. 09/608,682, entitled "RISK PROVISION IMPLEMENTATION FOR FINANCIAL PROCESSING IN A RELATIONAL DATABASE MANAGEMENT SYSTEM," filed on same date herewith, by George Robert Hood;

all of which are incorporated by reference herein.

BACKGROUND OF THE INVENTION

1. Field of the Invention

This invention relates in general to financial processing systems performed by computers, and in particular, to the implementation of "other revenue" calculations for financial processing using data accessed from a relational database management system.

2. Description of Related Art

Financial processing systems provide tools for financial analysis of accounting data. Typically, each financial processing system operates in a unique way and approaches financial analysis differently. Some financial processing systems are advanced in their approach to profitability calculations, and others are still at a more basic level. In addition, there is no agreement as to the rules for profitability calculations, outside of generally accepted accounting policies that external auditors use.

Yet, the majority of financial processing systems attempt to use profitability calculations to differentiate between sources of revenues and expenses. There is a need, then, for a flexible approach to profitability calculations in terms of the overall metric, as well as the type of data used.

SUMMARY OF THE INVENTION

A Value Analyzer is a data-driven computer-facilitated financial processing system that accesses account, event and organization attributes from a relational database management database, wherein: (1) the event attributes comprise data about account-related transactions, (2) the account attributes comprise data about accounts being measured, and (3) the organization attributes comprise data about the organization's financial status. Profitability calculations are performed using the account, event and organization attributes accessed from the relational database management system, as well as one or more profit factors and one or more rules. The profitability calculations include the following:

$$\text{Profit} = \text{Net Interest Revenue (NIR)} \\ + \text{Other Revenue (OR)} \\ - \text{Direct Expense (DE)} \\ - \text{Indirect Expense (IE)} \\ - \text{Risk Provision (RP)}$$

In this calculation, Other Revenue (OR) comprises: (1) revenue that can be associated with an account, (2) revenue that can be associated with a person, and (3) revenue that is not specifically associated with an account or person.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
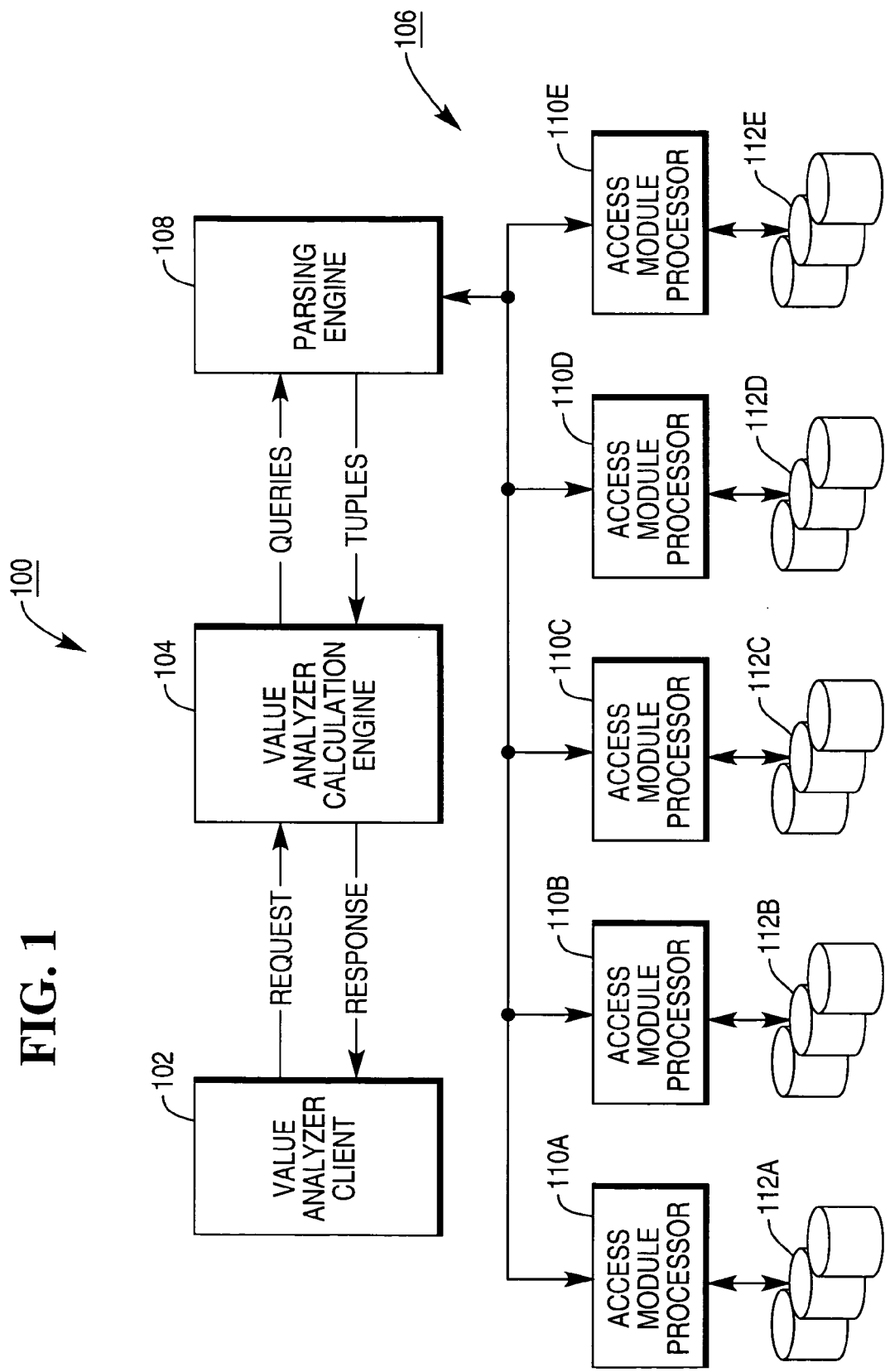
FIG. 1 illustrates an exemplary hardware and software environment according to the preferred embodiment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The Value Analyzer is a data-driven computer-facilitated financial model that provides accurate and consistent profitability calculations using account, event and organization data stored in a relational database management system (RDBMS), wherein: (1) the account attributes comprise data about accounts being measured, (2) the event attributes comprise data about account-related transactions, and (3) the organization attributes comprise data about the organization's financial status. The profitability calculations performed by the Value Analyzer rely on a Five Factor Atomic Profit Metric (FFAPM):

$$\text{Profit} = \text{Net Interest Revenue (NIR)} \\ + \text{Other Revenue (OR)}$$

-continued

- Direct Expense (DE)
- Indirect Expense (IE)
- Risk Provision (RP)
= NIR + OR − DE − IE − RP In the above equation, it is assumed that the sign of elements that reduce profit are negative and those that contribute are positive.

Each of the five factors of FFAPM are defined below:

Net Interest Revenue. This component comprises interest revenue, and is the largest component of profitability (e.g., from loans, deposits, cash, etc.).

Other Revenue. This component comprises non-interest revenue (e.g., fees and commissions), including those driven by events (e.g., open account, excessive counter withdrawals, early payout penalties, etc.).

Direct Expense. This component comprises expenses driven by events that are attributable to accounts.

Indirect Expense. This component comprises expenses that are not attributable to specific accounts. This includes expenses that relate to the cost of doing business that are not driven by account or event activity, such as those that arise from overheads, inefficiencies or differences between standard and actual costs (e.g., the CEO's salary, etc.).

Risk Provision. This component comprises the expected cost of risks that arise from the uncertainties of doing business, e.g., market risks, customer credit, competition, operations, regulatory risks, political risks, etc.

Each of these five factors can be measured for a desired period (daily, weekly, monthly, quarterly, etc.). Moreover, each factor is essentially discrete and independent with fundamentally different characteristics, which strengthens the user's ability to fully utilize the output to determine relationships between account, event and organization data, and enable consistent multiple dimensional aggregation.

The FFAPM is "atomic" in that profitability is computed using data stored in a relational database management system (RDBMS). There are three aspects to this:

components of profitability may be measured below the account level (at events which make up account activity over an accounting period) and accumulated to the account, components of profitability may be measured directly at the account level (such as interest paid or earned for an accounting period), components of profitability may be known, obtained, or aggregated at a higher level, and may be apportioned down to specific accounts and events according to various rules.

The Value Analyzer generally defines "indirect" components of profitability to be those which must be apportioned to accounts and "direct" components to be those which are either computed at the account level, or are rolled up to the account level from lower level events.

Hardware and Software Environment

FIG. 1 illustrates an exemplary hardware and software environment according to the preferred embodiment of the present invention. In the exemplary environment, a computer system 100 implements a financial processing system in a three-tier client-server architecture, wherein the first or client tier provides a Value Analyzer Client 102 that may include, inter alia, a graphical user interface (GUI), the second or middle tier provides a Value Analyzer Calculation Engine 104 for performing profitability calculations as described later in this application, and the third or server tier comprises a Relational DataBase Management system (RDBMS) 106 that stores the data and metadata necessary for performing the profitability calculations from the data and metadata stored in a relational database. The first, second, and third tiers may be implemented in separate machines, or may be implemented as separate or related processes in a single machine.

In the preferred embodiment, the Value Analyzer Client 102 and the Value Analyzer Calculation Engine 104 together are referred to as the Value Analyzer. Generally, the Value Analyzer Client 102 includes a graphical user interface (GUI) for operators of the system 100, wherein requests are transmitted to the Value Analyzer Calculation Engine 104 and responses are received therefrom. The Value Analyzer Calculation Engine 104 performs the profitability calculations and other processing, including commands or functions for performing various search and retrieval functions in the RDBMS 106, wherein queries are transmitted to the RDBMS 106 as requests and tuples are received therefrom as responses. The Value Analyzer Client 102 and the Value Analyzer Calculation Engine 104 may be implemented in separate machines, or may be implemented as separate or related processes in a single machine.

In the preferred embodiment, the RDBMS 106 includes at least one Parsing Engine (PE) 108 and one or more Access Module Processors (AMPs) 110A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBM's could be used.

In the preferred embodiment, the system 100 may use any number of different parallelism mechanisms to take advantage of the parallelism offered by multiple Access Module Processors 110. Further, data within the relational database may be fully partitioned across all data storage devices 112 in the system 100 using hash partitioning or other partitioning methods.

Generally, the Value Analyzer Client 102, Value Analyzer Calculation Engine 104, parallelism mechanisms to take advantage of the parallelism offered by multiple Access Module Processors 110. Further, data within the relational database may be fully partitioned across all data storage devices 112 in the system 100 using hash partitioning or other partitioning methods.

Generally, the Value Analyzer Client 102, Value Analyzer Calculation Engine 104, RDBMS 106, Parsing Engine 108, and/or Access Module Processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present inven-

Value Analyzer Data Flow

Figure 2:
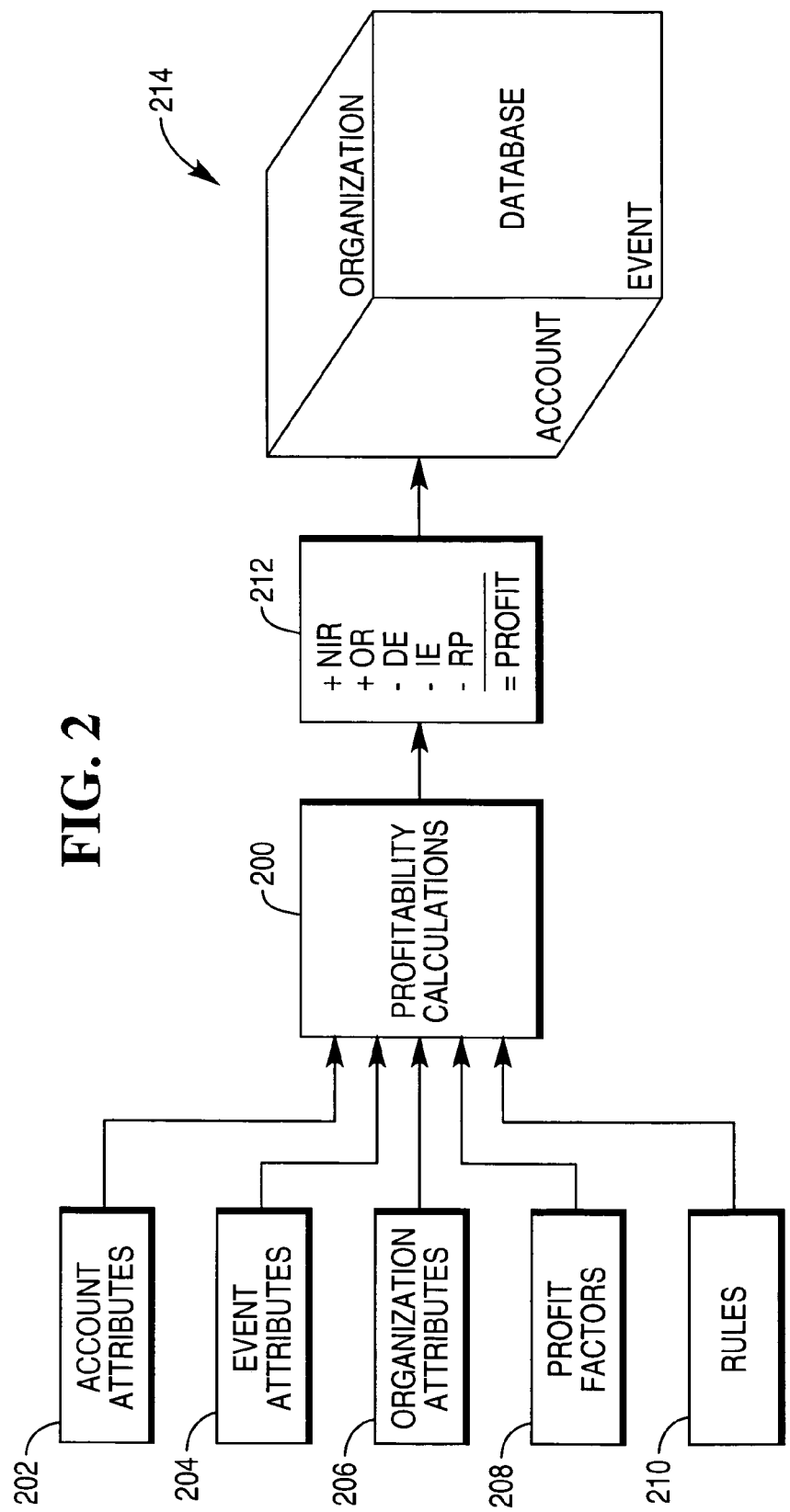
FIG. 2 is a data flow diagram that illustrates the operation of the Value Analyzer according to the preferred embodiment of the present invention.

FIG. 2 is a data flow diagram that illustrates the operation of the Value Analyzer Calculation Engine 104 according to the preferred embodiment of the present invention. Within the Value Analyzer Calculation Engine 104, one or more Profitability Calculations 200 accept a number of inputs including Account Attributes 202, Event Attributes 204, Organization Attributes 206, and Profit Factors 208. Thereafter, the Profitability Calculations 200 invoke one or more Rules 210 that generate the FFAPM 212, which in turn are used to create the Database 214. The Database 214 may be represented along account, event, or organization dimensions, or along other dimensions as may be required. These elements are described in more detail below.

Input Definitions

Account Attributes 202 comprise data about the accounts being measured. This data includes: balance, rate (or interest accrued), product identification, limits, expected default frequency, and various dates (e.g., open, rate reset, last payment, next payment, maturity, etc.).

Event Attributes 204 comprise data about account-related events or transactions. This data includes: account identification, event or transaction amounts, event or transaction location, event or transaction time, counter-party identification, event or transaction type (e.g., loan payment, interest paid, loan draw down amount, etc.).

Organization Attributes 206 comprise data about the financial status of the organization. This data includes: balance sheet and profit statement amounts aggregated by the legal or management entities that own the account base being measured.

Profit Factors 208 include parameter values necessary to perform the Profitability Calculations 200. The major classifications of this data include:

- Funds transfer rates are pricing methods that require matched maturity opportunity rates for use in valuing each account's marginal use or source of internal funds.
- Unit costs are used for Direct Expense calculations, where a total cost is provided as an Organization Attribute 206 and the Unit Cost is then derived by dividing total cost by actual volume. Unit Costs can be either standard, actual, or market, and ideally represent marginal values (if "fully absorbed measures" are used, then the usefulness of allocated amounts is diminished.)
- Allocated amounts are used in both Other Revenue and Indirect Expense calculations, wherein the allocated amounts are apportioned amongst all accounts in a group.
- Miscellaneous calculation values may comprise, for example, the number of days in a profit measurement period, an equity allocation weighting, etc. These values are known as "modeling" parameters.
- Amortization parameters are used in interest amortization, which requires interest rates and life values used by straight line amortization and by declining balance of amortization.
- Risk measurement parameters are used in Risk Provision calculations, which require various factors, such as: loss rates, reserve percentages, exposure factors, recovery rates, default probabilities and collection costs.
- Tax rates are required for after-tax profit calculation. The Value Analyzer is designed to calculate pre-tax income on a taxable equivalent basis (where an effective tax rate is all that is required to transform pre-tax income into after tax earnings, i.e., Profit).

Rules

The Profitability Calculations 200 use one or more Rules 210 applied to data retrieved from the RDBMS 106. These Rules 210 include, inter alia, the following:

Treatments. Every account with cash flows affecting an organization's balance sheet requires a method of valuing the account's use of internal funds. One approach is "matched maturity funds transfer pricing," which uses a canonical representation of an account's funding characteristics and then determines a value based on adjusted market yields for each instance that requires an interest rate transfer price to calculate an account's marginal Net Interest Revenue.

Equity Allocation. In order to provide precise Net Interest Revenue calculations, the amount of equity funds required at an account must be determined. This rule allows for equity allocation using any of the following methods: simple ratios; regulatory definitions; economic allocations, or user defined allocations.

Apportionment. Other Revenue, Risk Provision and Indirect Expense calculations are applied at the account level using Organization Attributes 206 that are not related directly to account activity. These profit adjustments are made so that the sum of all account-level Profitability Calculations 200 comprises the overall profit. One approach is to pool indirect costs and revenues and then apportion them. Apportionment rules specify how the pooled indirect costs and revenues is completely allocated to appropriate accounts, wherein the preferred embodiment uses closed form allocation rules, which require only information known in the current period and not iterative computation.

Amortization. Some types of income or expense are deferred or accrued over multiple periods, including and subsequent to the current accounting period. This is common to accrual accounting methods used in profit presentations of financial statements, and gives rise to timing differences between cash flows and their related profit as presented in a financial statement in any accounting period. Since the Value Analyzer is designed to reconcile to the financial statement's profit values, it supports deferral and accrual. accounting principles. Amortization methods that account for these timing differences are: interest amortization (used for interest income and expense accruals and for deferral of fees that are in lieu of interest), and straight line or declining balance amortizations (used for cost deferrals and investment depreciation).

Other Revenue Pricing. In situations where account and event activity can be used to derive account level income or fees, the Value Analyzer calculates these drivers of the profitability in the Other Revenue calculations. These calculations comprise linear combinations of event or account values and modeled coefficients.

Direct Expense. The calculation of account profit adjustments due to account-related activity requires rules that take the form of linear combinations of event or account values and modeled coefficients.

Indirect Expense. In situations where expense apportionment or amortization amounts are aggregated, the user may want different rules applied depending on the path (or dimension) of aggregation. These rules allow for multiple profit calculations rules to be applied to derive multiple account level Indirect Expense amounts.

Risk Provision. Adjusting current profit for expected future losses is known as "actuarial" profit provisioning. The Value Analyzer applies actuarial-based methods in its account level profit calculations, where the actuarial reserve that the provisions maintain represents the expected loss associated with all accounts.

Taxable Equivalent Gross-up. Profit is an after-tax measure, and thus some events or portions of some accounts' profits may be excluded from normal taxation. The Value Analyzer adjusts there pre-tax values, so that a singular tax rate can be used to convert pre-tax profit into after-tax values, which are also known as taxable equivalent adjustment. These rules use account and event attributes to adjust each of the five factors of the FFAPM to a taxable equivalent basis.

Interest Yield Adjustments. Since the Value Analyzer can calculate profits for any number of periods, the adjustment of cash interest payments, and the financial statement's accrual or smoothed representation of interest-related Profit, The Value Analyzer provides a method for converting cash interest amounts to accrual amounts for financial statements. The Value Analyzer implements an "effective interest rate" conversion to accomplish this type of calculation.

Profitability Calculations

The following describes the method used by the Profit Calculations 200:
1. Retrieve data from the RDBMS 106.
2. Calculate Net Interest Revenue for every account.
3. Calculate Other Revenue for every account.
4. Calculate Direct Expense for every account.
5. Calculate Indirect Expense for every account.
6. Calculate Risk Provision for every account.
7. Calculate Profit for every account.
8. Store the FFAPM Profit and the five factors of FFAPM into the RDBMS 106.
9. Aggregate and/or re-calculate the FFAPM Profit and the five factors of FFAPM as necessary.

Note that steps 2 through 6 perform account-level calculations. Steps 2, 3, 4, 5, and 6 can be performed independently and in parallel, while step 7 requires values derived in steps 2, 3, 4, 5, and 6, and therefore must be performed after steps 2, 3, 4, 5, and 6 are completed.

Output Definition

The Profit Calculations 200 generate one or more values for the five factors of the FFAPM 210, and specifically, the NIR, OR, DE, IE, RP, and Profit values. These values are used to generate the output data 214, which can be stored by the RDBMS 106 in the relational database.

Analytic Variations

The Value Analyzer operates on data and calculations across a continuum, in order to provide the analytic variations necessary for financial processing at various levels of aggregation. This continuum is comprised of multiple tiers as described below:

basic->intermediate->advanced->breakthrough.

Not every tier is necessarily present for each element of data or every calculation.

This continuum embodies the notion of inheritance, wherein the data and calculations of the higher tiers embody the data and calculations of the lower tiers. The principle of inheritance means that the data and calculations by which the separate tiers are defined are nested, i.e., the definition of "intermediate" includes the definition of "basic," but with added functionality that goes beyond "basic," and so on. Thus, there is consistency in the data and calculations performed at the different tiers in the continuum.

Other Revenue

As noted above, Other Revenue (OR) refers to revenue other than Net Interest Revenue (NIR). In the preferred embodiment, there are three kinds of OR: (1) that which can be associated with an account (an account-based fee, for example), (2) that which can be associated with a person (commissions for services, for example), and (3) that which is not specifically associated with an account or person (all other income). In the preferred embodiment, there are three components of Other Revenue: Actual Other Revenue, Expected Other Revenue, and Other Revenue Foregone, all of which are described below.

Actual Other Revenue

Actual Other Revenue (OR) is the revenue that is actually received on each account. This is determined by utilizing detailed event or transaction data and assessing the total fee income received. Frequently, organizations establish policies for fees, but the amounts stated in the policies and procedures are not always received (fees may be waived, not collected, reduced, etc.). The Actual OR component establishes the amount received from the account, regardless of the fee policies and procedures.

There are two fundamental types of Actual OR that are assessed:

One-time Fees—these are fees that are charged for a once-off or unusual service. An example of a once-off fee is a loan application feed. The Value Analyzer also supports deferral of one-times fees in accrual accounting.

Recurring Fee—these are fees that are charged periodically (not necessarily the same amount each time) for ongoing account service. An example of a Recurring Fee is a monthly account maintenance fee.

Expected Other Revenue

Expected Other Revenue (OR) is the amount of income expected to be received, e.g., as stated in the pricing policies. In essence, Expected OR represents the fees that have been established to cover costs and provide an adequate level of profit.

Fee policies and procedures are generally established at product and account levels. For example, a checking account with average monthly balance below $500 may attract a maintenance fee of $20; if the balance is between $500 and $5,000; then the fee may be $10; if the balance is greater than $5,000, then the fee may be $0. However, while policies relating to the charging of fees are common, they are not always followed and fees are often waived regardless of whether stated policy criteria is met.

There are in general two types of fee waivers:

Discretionary Waiver—These are fees that are waived on a discretionary basis in order to attract and retain business.

Policy Waiver—These are fees that may be waived as a matter of policy. For example, if the average monthly balance exceeds $5,000, a monthly account maintenance fee may be waived.

Other Revenue Foregone

Other Revenue (OR) Foregone is the amount of revenue foregone on each account, which is the difference between Expected OR and Actual OR. OR Foregone provides the ability to monitor fee strategies, including both Discretionary and Policy Waivers. OR Forgone is important, since it is believed that it influences customer behavior.

An example of OR Foregone is demonstrated as follows:

| Mortgage Loan | | |
|---|---|---|
| Pricing Policy: | Loan Application Fee = $400 | = Expected OR |
| Transaction Detail: | Actual Transaction = $300 | = Actual OR |
| Computation: | Calculated Difference = $100 | = OR Foregone |

The loan application fee in this case may have been reduced if the customer had a strong and valuable relationship with the lender. In this example, an Expected OR of $400 is based on Pricing Policy, an Actual OR of $300 is derived from Transaction Detail, and an OR Foregone of $100 is calculated as the difference between Expected OR and Actual OR.

Note that while Expected OR and OR Foregone are calculated, they are not part of the total account profit. Only revenue that is actually received contributes to the total account profile.

Other Revenue in the Basic Tier

Following are the inputs and outputs of the calculation of Other Revenue in the Basic Tier:

| Inputs | Outputs |
|---|---|
| Partitioning of OR | Actual OR (via allocation methods) |
| Rules for determining the map of account a to the OR | |
| Allocation methods for each partition, and corresponding variables (such as balances or transactions, depending on the allocation method) | |

One approach to the calculation of OR is to first identify the OR components, and then partition these components into categories based on: (a) which accounts are to obtain an allocation from a given partition; and (b) the methods by which the allocations are made.

In the discussion that follows, let:
$OR_i$=A partition of Other Revenue,
$OR_i(a)$=The amount of $OR_i$ apportioned to account a,
$A(OR_i)$=The accounts that map to $OR_i$.
There are a few simple properties of this partitioning:
The total OR being partitioned must equal the sum of all the partition amounts. That is, $\Sigma OR_i$=OR.
The apportionment of $OR_i$ to the associated accounts totals to $OR_i$. That is, $\Sigma OR_i(a_k)$=$OR_i$, when summed over k.
An account may be associated with more than one partition of OR.
Some partitions may be associated with all accounts.
If all of OR is not allocated, then the unallocated OR can be considered to be a partition to which no account is associated.

In the preferred embodiment, four different allocation methods are used in the Basic Tier:
balance method,
count method,
transaction count method, or
transaction amount method.

These four different allocation methods are described in more detail below.

Let M be one of these fourth methods, where M is dependent upon the partition under consideration.

If $M(OR_i)$="balance," then:

$$OR_i(a) = OR_i * \frac{\text{average balance}(a)}{\sum_j (\text{average balance}(a_j))}$$

where the summation is over all $a_j$ in $A(OR_i)$.
If $M(OR_i)$="count," then:

$$OR_i(a) = OR_i * \frac{1}{(\text{count}(a_j) \text{ in } A(OR_i))}$$

where the count is over all $a_j$ in $A(OR_i)$.
If $M(OR_i)$="transaction count," then:

$$OR_i(a) = OR_i * \frac{\sum_p \text{count of transactions for } (a)}{\sum_j \sum_p \text{count of transactions for } (a)}$$

where p is the number of transactions over the period and the summation is over all $a_j$ in $A(OR_i)$.
If $M(OR_i)$="transaction amount," then:

$$OR_i(a) = OR_i * \frac{\sum_p \text{transaction amounts for } (a)}{\sum_j \sum_p \text{transaction amounts for } (a)}$$

where p is the number of transactions over the period, the summation is over all $a_j$ in $A(OR_i)$, and the transactions are restricted to a transaction or event type.

Total OR for an account is given by the sum of these allocations for all partitions for which account a has an association:

$$OR(a) = \sum_i (OR_i(a))$$

Other Revenue in the Intermediate Tier

Following are the inputs and outputs of the calculation of Other Revenue in the Intermediate Tier:

| Inputs | Outputs |
|---|---|
| OR as posted to account a | Actual Other Revenue (cash accounting, or accrual if the accruals are posted at the account or event levels) |

In the Intermediate Tier, the approach of Value Analyzer is: (a) include the data and calculations of the Basic Tier; and (b) to provide additional functionality based on Organization Attributes 206. This additional functionality calculates Non-Interest Revenue (NIR) by simply taking the amount posted to the account (that is generally a cash accounting approach) or take a posted amount, and applying a factor to it.

The formulas for calculating OR are provided below:
Let:

| | |
|---|---|
| a = | Account being considered |
| $OR_i(a)$ = | OR apportioned to a (if any) from a partition $OR_i$. |
| $Txn(t)_i(a)$ = | The transactions reflecting the activity of account a in the period restricted to a given event type t. |
| $Amt(Txn_i(a))$ = | The transaction amount (0 if null). |
| $Rev(Txn_i(a))$ = | The revenue amount associated with this transaction. This is assumed to be of the form $[\alpha * Amt(Txn_i(a)) + \beta]$ where $\alpha, \beta$ are preset values based on the event type. |
| $OR(a)$ = | Total OR apportioned to account a. |

Then:

$$OR(a) = \sum_{type\,t} \sum_i (Rev(Txn(t)_i(a)))$$

which is summed over all the transactions of account a and includes apportioned revenue as in the Basic Tier.
Thus:

$$OR(a) = \sum_{type\,t} \sum_i [\alpha * Amt(Txn(t)_i(a)) + \beta] + \sum_i (OR_i(a))$$

In the above, note that "transaction" is considered to be synonymous with "event."

LOGIC OF THE PREFERRED EMBODIMENT

Figure 3:
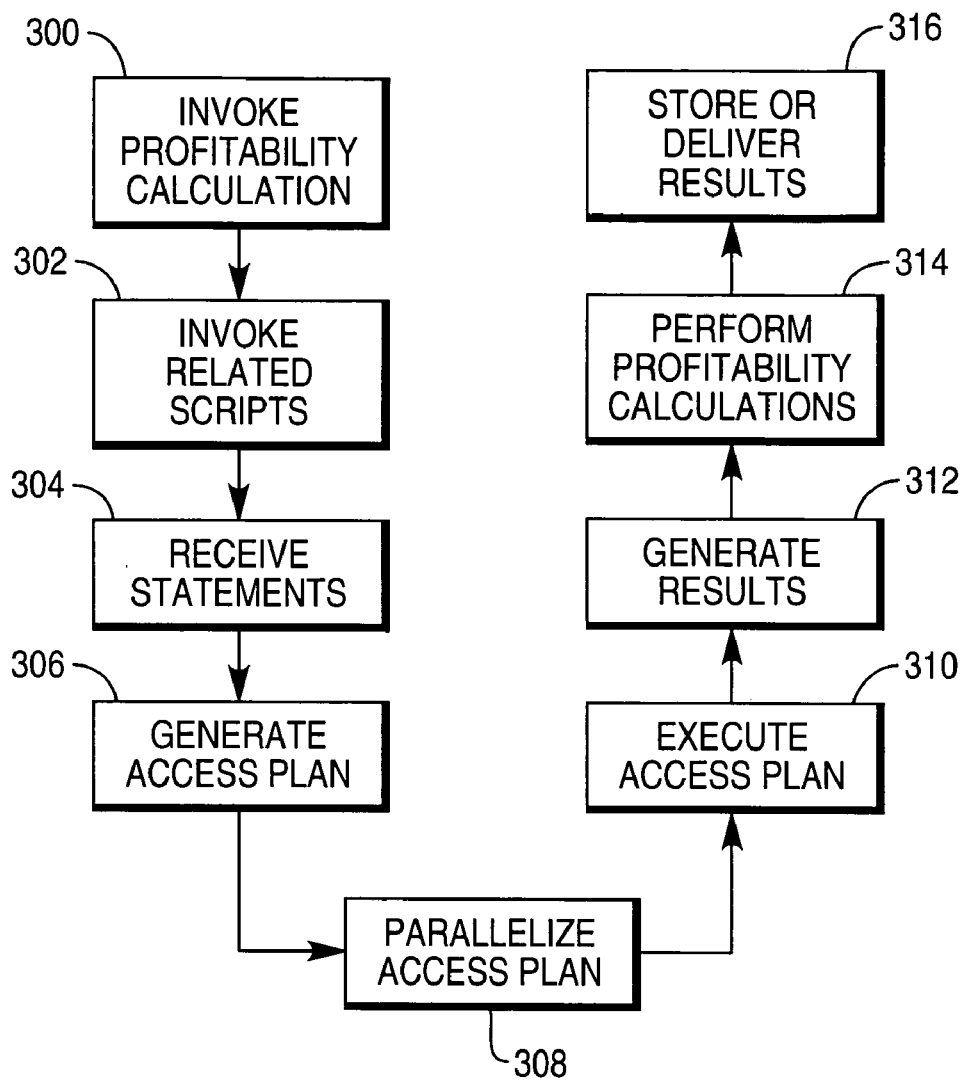
FIG. 3 is a flow chart illustrating the steps necessary for the execution of Profitability Calculations according to the preferred embodiment of the present invention.

FIG. 3 is a flow chart illustrating the steps necessary for the execution of Profitability Calculations 200 according to the preferred embodiment of the present invention. Those skilled in the art will recognize that this logic is provided for illustrative purposes only and that different logic may be used to accomplish the same results.

Block 300 represents the Value Analyzer Client 102 invoking one or more Profitability Calculations 200 in the Value Analyzer Calculation Engine 104.

Block 302 represents the Value Analyzer Calculation Engine 104 invoking one or more scripts related to the invoked Profitability Calculations 200, wherein the scripts comprise SQL (Structured Query Language) statements that are transmitted to the RDBMS 106. These SQL statements access account, event and organization attributes from the database managed by the RDBMS 106.

Block 304 represents the Parsing Engine 108 of the RDBMS 106 receiving the SQL statements and transforming the statements into an operator tree.

Block 306 represents the Parsing Engine 108 of the RDBMS 106 generating one or more access plans from the operator tree.

Block 308 represents the Parsing Engine 108 of the RDBMS 106 parallelizing the access plans, and then transmitting the access plans to their assigned Access Module Processors 110A-E of the RDBMS 106.

Block 310 represents the Access Module Processors 110A-E of the RDBMS 106 performing the required data manipulation associated with the access plans received from the Parsing Engine 108, wherein the access plans are performed in parallel by the Access Module Processors 110A-E.

Block 312 represents the Parsing Engine 108 of the RDBMS 106 merging the results received from the Access Module Processors 110A-E and providing the merged results to the Value Analyzer Calculation Engine 104 as account, event and organization attributes.

Block 314 selects the Other Revenue from one or more sources, i.e., Actual Other Revenue, Expected Other Revenue, and Other Revenue Foregone. The Actual Other Revenue is selected from one or more sources selected from a group comprising: One-time Fees and Recurring Fees. The Expected Other Revenue is revenue expected to be received. The Other Revenue Foregone is revenue foregone on each account, i.e., the difference between the Expected Other Revenue and the Actual Other Revenue.

Block 316 partitions and apportions the selected Other Revenue to one or more accounts associated with each partition using one or more specified allocation methods selected from a group comprising: balance method, count method, transaction count method, or transaction amount method, which are described above.

Block 318 represents the Value Analyzer Calculation Engine 104 performing the invoked Profitability Calculations 200 using the account, event and organization attributes accessed from the RDBMS 106, as well as one or more profit factors and one or more rules. In this Block, the Profitability Calculations 200 include:

| | |
|---|---|
| Profit | = Net Interest Revenue (NIR) |
| | + Other Revenue (OR) |
| | − Direct Expense (DE) |
| | − Indirect Expense (IE) |
| | − Risk Provision (RP) | wherein Other Revenue (OR) comprises: (1) revenue that can be associated with an account, (2) revenue that can be associated with a person, and (3) revenue that is not specifically associated with an account or person. In this Block, the profit factors include parameter values necessary to perform the profitability calculations and the rules direct operations of the profitability calculations.

Block 320 represents the Value Analyzer Calculation Engine 104 delivering the output or results from the invoked Profitability Calculations 200 to the Value Analyzer Client 102 and/or the RDBMS 106. With regard to the Value Analyzer Client 102, the results may be presented to the user, printed, or used by various other computer programs, as desired. With regard to the RDBMS 106, the results may be stored for later use by the Value Analyzer Calculation Engine 104, or other computer programs, as desired.

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention.

In summary, the present invention discloses a Value Analyzer, which is a data-driven computer-facilitated financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed using the account, event and organization attributes accessed from the relational database management system, as well as one or more profit factors and one or more rules. The profitability calculations include the following:

| | | |
|---|---|---|
| Profit | = | Net Interest Revenue (NIR) |
| | + | Other Revenue (OR) |
| | − | Direct Expense (DE) |
| | − | Indirect Expense (IE) |
| | − | Risk Provision (RP) |

In this calculation, Other Revenue (OR) comprises: (1) revenue that can be associated with an account, (2) revenue that can be associated with a person, and (3) revenue that is not specifically associated with an account or person.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing financial processing in a computer, comprising:
   (a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status;
   (b) performing one or more profitability calculations in the computer using the account, event and organization attributes accessed from the database, as well as one or more profit factors and one or more rules, wherein the profitability calculations include:

| | | |
|---|---|---|
| Profit | = | Net Interest Revenue (NIR) |
| | + | Other Revenue (OR) |
| | − | Direct Expense (DE) |
| | − | Indirect Expense (IE) |
| | − | Risk Provision (RP) |

(c) wherein the Other Revenue comprises: (1) revenue that is associated with an account, (2) revenue that is associated with a person, and (3) revenue that is not specifically associated with an account or person.

2. The method of claim 1, wherein the profit factors include parameter values necessary to perform the profitability calculations.

3. The method of claim 1, wherein the rules direct operations of the profitability calculations.

4. The method of claim 1, wherein the Other Revenue is selected from one or more sources selected from a group comprising: Actual Other Revenue, Expected Other Revenue, and Other Revenue Foregone.

5. The method of claim 4, wherein the Actual Other Revenue is selected from one or more sources selected from a group comprising: One-time Fees and Recurring Fees.

6. The method of claim 4, wherein the Expected Other Revenue is revenue expected to be received.

7. The method of claim 4, wherein the Other Revenue Foregone is revenue foregone on each account.

8. The method of claim 4, wherein the Other Revenue Foregone is the difference between the Expected Other Revenue and the Actual Other Revenue.

9. The method of claim 1, wherein the Other Revenue is partitioned and apportioned to one or more accounts associated with each partition using one or more specified allocation methods selected from a group comprising: balance method, count method, transaction count method, or transaction amount method.

10. A system for financial processing, comprising:
    a computer;
    logic, performed by the computer, for:
    (a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status;
    (b) performing one or more profitability calculations in the computer using the account, event and organization attributes accessed from the database, as well as one or more profit factors and one or more rules, wherein the profitability calculations include:

| | | |
|---|---|---|
| Profit | = | Net Interest Revenue (NIR) |
| | + | Other Revenue (OR) |
| | − | Direct Expense (DE) |
| | − | Indirect Expense (IE) |
| | − | Risk Provision (RP) |

(c) wherein Other Revenue comprises: (1) revenue that can be associated with an account, (2) revenue that can be associated with a person, and (3) revenue that is not specifically associated with an account or person.

11. The system of claim 10, wherein the profit factors include parameter values necessary to perform the profitability calculations.

12. The system of claim 10, wherein the rules direct operations of the profitability calculations.

13. The system of claim 10, wherein the Other Revenue is selected from one or more sources selected from a group comprising: Actual Other Revenue, Expected Other Revenue, and Other Revenue Foregone.

14. The system of claim 13, wherein the Actual Other Revenue is selected from one or more sources selected from a group comprising: One-time Fees and Recurring Fees.

15. The system of claim 13, wherein the Expected Other Revenue is revenue expected to be received.

16. The system of claim 13, wherein the Other Revenue Foregone is revenue foregone on each account.

17. The system of claim 13, wherein the Other Revenue Foregone is the difference between the Expected Other Revenue and the Actual Other Revenue.

18. The system of claim 10, wherein the Other Revenue is partitioned and apportioned to one or more accounts associated with each partition using one or more specified allocation methods selected from a group comprising: balance method, count method, transaction count method, or transaction amount method.

19. An article of manufacture embodying logic for performing financial processing in a computer, comprising:
   (a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status;
   (b) performing one or more profitability calculations in the computer using the account, event and organization attributes accessed from the database, as well as one or more profit factors and one or more rules, wherein the profitability calculations include:

$$\text{Profit} = \text{Net Interest Revenue (NIR)} \\ + \text{Other Revenue (OR)} \\ - \text{Direct Expense (DE)} \\ - \text{Indirect Expense (IE)} \\ - \text{Risk Provision (RP)}$$

(c) wherein Other Revenue comprises: (1) revenue that can be associated with an account, (2) revenue that can be associated with a person, and (3) revenue that is not specifically associated with an account or person.

20. The article of manufacture of claim 19, wherein the profit factors include parameter values necessary to perform the profitability calculations.

21. The article of manufacture of claim 19, wherein the rules direct operations of the profitability calculations.

22. The article of manufacture of claim 19, wherein the Other Revenue is selected from one or more sources selected from a group comprising: Actual Other Revenue, Expected Other Revenue, and Other Revenue Foregone.

23. The article of manufacture of claim 22, wherein the Actual Other Revenue is selected from one or more sources selected from a group comprising: One-time Fees and Recurring Fees.

24. The article of manufacture of claim 22, wherein the Expected Other Revenue is revenue expected to be received.

25. The article of manufacture of claim 22, wherein the Other Revenue Foregone is revenue foregone on each account.

26. The article of manufacture of claim 22, wherein the Other Revenue Foregone is the difference between the Expected Other Revenue and the Actual Other Revenue.

27. The article of manufacture of claim 19, wherein the Other Revenue is partitioned and apportioned to one or more accounts associated with each partition using one or more specified allocation methods selected from a group comprising: balance method, count method, transaction count method, or transaction amount method.

* * * * *